No. 731,150. PATENTED JUNE 16, 1903.
R. C. ANDERSEN.
TRANSPORTATION OR STORAGE RECEPTACLE.
APPLICATION FILED FEB. 12, 1903.
NO MODEL.

Witnesses
C. M. Catlin
W. R. Bird

Inventor
Richard C. Andersen
By Benj. R. Catlin
Attorney

No. 731,150. Patented June 16, 1903.

UNITED STATES PATENT OFFICE.

RICHARD C. ANDERSEN, OF EL PASO, TEXAS, ASSIGNOR OF ONE-HALF TO CLIFFORD E. McKEE, OF EL PASO, TEXAS.

TRANSPORTATION OR STORAGE RECEPTACLE.

SPECIFICATION forming part of Letters Patent No. 731,150, dated June 16, 1903.

Application filed February 12, 1903. Serial No. 143,138. (No model.)

*To all whom it may concern:*

Be it known that I, RICHARD C. ANDERSEN, a resident of El Paso, in the county of El Paso and State of Texas, have invented certain new and useful Improvements in Transportation or Storage Receptacles; and I do hereby declare the following to be a full, clear, and exact description of the invention, such as will enable others skilled in the art to which it pertains to make and use the same.

The invention relates to a receptacle for transporting or temporarily storing perishable articles—such as eggs, meat, cut flowers, and the like—and has for its object to maintain a temperature lower than that of the surrounding atmosphere and also to exclude dust, objectionable odors, and vermin and to effect these purposes by a simple, convenient, and economical structure.

The invention consists in the construction hereinafter described and pointed out.

Figure 1:
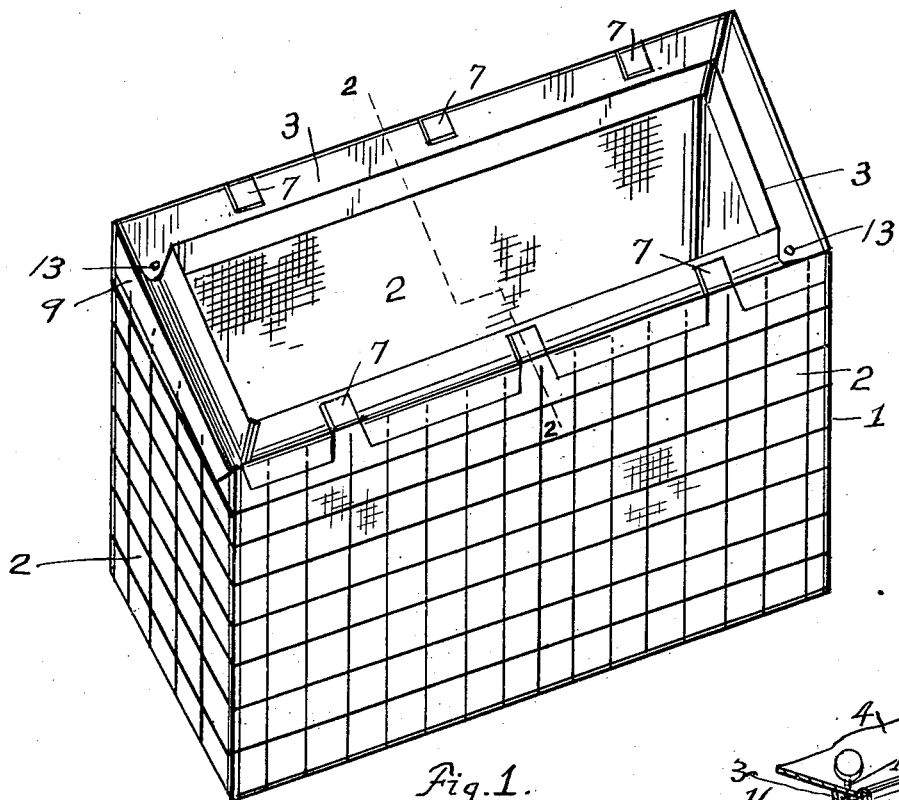
Figure 2:
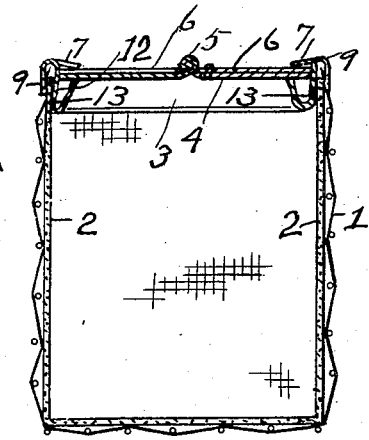
Figure 3:
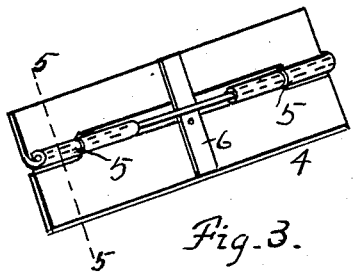
Figure 4:
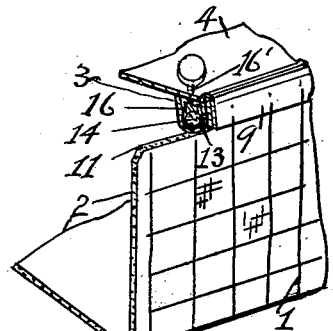
Figure 5:
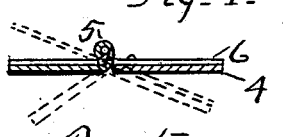

In the accompanying drawings, Figure 1 is a perspective of the receptacle, the cover being omitted. Fig. 2 is a section on line 2 2 of Fig. 1, the cover being in place. Fig. 3 is a perspective, on a smaller scale than Figs. 1 and 2, of the cover, comprising two parts hinged together and adjusted for application to or removal from the receptacle. Fig. 4 is a partial perspective of a water holder and distributer. Fig. 5 is a section on line 5 5 of Fig. 3.

Numeral 1 denotes a receptacle, preferably made of wire and having an open mesh, it being essential that it permit free access of air to an inner lining or vessel 2, made of porous material.

3 indicates a perforated water holder and distributer.

4 denotes a detachable cover, preferably comprising two parts hinged together.

Numeral 5 denotes hinges, and 6 is a plate fixed to one part of the cover and extended across the other in a manner to prevent the backward closing of the two parts of the cover. This plate 6 is fixed to one part of the cover by a pivot and is normally in contact with both parts, as shown in Figs. 2, 3, and 5. When, however, the parts are turned on the hinge-pintle to narrow the cover, the free end of the plate 6 remains in the same plane as its fastened end, all as indicated in broken lines in Fig. 5. When thus narrowed and in the form indicated by broken lines in Fig. 5, the cover can be applied to the receptacle, the plate 6 being turned on its pivot by inserting the opposite free edges of the cover under the catches 7, whereupon, the hinge edge of the cover being depressed, it assumes the fastened position shown in Fig. 2. The plate 6 being then suitably turned on its pivot engages under the adjacent catches 7 and fastens the cover in place.

7 denotes catches to engage the free edges of the cover, as indicated. The cover can be placed on the receptacle by partially closing its parts and inserting the free edges of the parts under the catches and depressing the hinge-line of the cover.

The catches 7 are conveniently formed on the upper side of the water-distributer 3 by bending parts cut out of a sheet-metal strip 9 of the vessel in manner indicated in Fig. 2.

2 denotes a capillary lining, preferably of asbestos cloth, covering the interior of the receptacle or chamber 1. The upper edge of the lining 2 and the water-distributing vessel 3 are conveniently secured to an offset 11 of the main receptacle by compressing them between the part 9 of vessel 3 and a part 12, as shown.

The distributer 3 is provided with perforations 13, through which water percolates and is distributed to and through the fibrous, porous, or similar lining.

In some cases a fibrous strip, cord, or the like 14, is placed in the distributer in manner to check the escape of water through the perforations 13, and this may be made adjustable to produce more or less pressure of the porous material 14 along the line of the perforations 13 by means of an adjustable bearing-plate or rod 16, as by screw 16'. In practice the distribution of water will be such as to moisten the entire lining, or the major part of it, and to keep it moist notwithstanding evaporation, but so limited that there shall be no leakage.

The improvements are applicable to both portable and stationary receptacles or chambers of any desired size which are to be cooled by vaporization of a fluid distributed to the lining.

The invention is not limited to the particular construction except as hereinafter pointed out. It is not essential in all cases that the water distributer be situated outside the vertical planes of the walls of the main chamber or receptacle; but that construction is preferred in many cases because it does not obstruct the open top of the receptacle. It is not, however, essential in all cases that the receptacle or chamber have an opening in its top or that it have a hinged cover.

I am aware that a drip-cloth has been arranged centrally in a cold-air space surrounding in part a refrigerator, the interior wall of the refrigerator being perforated or reticulated to provide for air circulation. In such construction the drip-cloth was outside and separated from the perforated wall. By my improvement the drip-lining material is contiguous a perforated wall and supported and defended by said wall, which is the exterior of the refrigerator.

I am aware that refrigerators with walls composed of perforated metal and fibrous capillary material are known and that barrel-covers have comprised hinged sections and that other devices employed by me are not broadly new. My refrigerator has its exterior consisting of single perforated metallic walls lined with asbestos or equivalent. It has its entire top open to give the freest access, said open top being provided with an entirely-removable cover consisting of two hinged parts whereby it can be partially collapsed to permit placing the same under retaining-catches or removing it therefrom. In the preferred form it has a water holder and distributer situated entirely outside the horizontal area of its top, so as not to interfere therewith, but beneath the cover, which closes the top. My improvement, therefore, is characterized by simplicity and economy of construction and by efficiency and economy in use.

Having described my invention, what I claim as new, and desire to secure by Letters Patent, is—

1. The open-topped receptacle made of reticulated material and having an interior porous lining in contact with said material, a water holder and distributer situated outside the horizonal area of the top of said receptacle to leave said top entirely open or free when uncovered for the introduction and removal of the receptacle contents, and a removable cover.

2. The open-topped receptacle made of reticulated material and having an interior porous lining in contact with said material, a water holder and distributer situated outside the horizontal area of the top of said receptacle to leave said top entirely open or free when uncovered for the introduction and removal of the receptacle contents, and a removable cover, said cover extending over the water holder and distributer.

3. A cooling-receptacle, having in its walls porous material, a water holder and distributer extending along the top of the walls of said holder and provided with a plurality of discharge-openings to deliver water to be evaporated from said walls, and means for regulating discharge of water from the holder, said means consisting of porous material lying in the holder above its perforated parts, and separate devices for compressing said material in the holder above its perforations.

4. A reticulated receptacle, an interior porous lining for the same, a water holder and distributer having a flange, said reticulated receptacle and lining being in contact and compressed at their edges between the holder and its flange.

5. A wire receptacle lined interiorly at its sides, bottom and ends with an asbestos lining in contact with the wire, and having its entire top open, a two-part hinged cover to close the receptacle, and catches 7, all substantially as described, whereby the parts of the cover can be turned on the hinge farther and lifted from under the catches to expose the entire horizontal area of the receptacle and whereby by a reverse operation the said receptacle can be covered and the cover secured under the catches.

6. A wire receptacle lined interiorly at its sides, bottom and ends with an asbestos lining in contact with the wire, and having its entire top open, a water holder and distributer situated outside the top of the receptacle, a two-part hinged cover to close the receptacle and cover the water-holder, and catches 7, all substantially as set forth, whereby the parts of the cover can be turned on the hinge farther and lifted from under the catches to expose the entire horizontal area of the receptacle and whereby by a reverse operation the said receptacle can be covered and the cover secured under the catches.

In testimony whereof I have signed this specification in the presence of two subscribing witnesses.

RICHARD C. ANDERSEN.

Witnesses:
 CHARLES B. PATTERSON,
 PEYTON J. EDWARDS.